United States Patent Office 3,203,756
Patented Aug. 31, 1965

3,203,756
METHOD OF PREPARING PERMONOSULPHATES
Anthony MacDonald Hildon, Dunstable, England, assignor to Laporte Chemicals Limited, Luton, England, a British company
No Drawing. Filed Mar. 27, 1962, Ser. No. 182,946
Claims priority, application Great Britain, Mar. 27, 1961, 11,143/61
15 Claims. (Cl. 23—114)

This invention relates to a process for the preparation of the permonosulphates of sodium potassium, rubidium, caesium and ammonium.

According to the present invention there is provided a process for the preparation of the permonosulphate of sodium, potassium, rubidium, caesium or ammonium by the reaction between the corresponding bisulphate and aqueous hydrogen peroxide, wherein the reaction is conducted within the temperature range of 70° C. to 150° C. and such a manner that the hydrogen peroxide:bisulphate molar ratio is maintained above 1, the vapour phase in contact with the phase containing bisulphate contains at least 30 moles percent hydrogen peroxide based on the hydrogen peroxide plus water content of the vapour, and the combined partial pressures of hydrogen peroxide and water in the vapour phase do not exceed 100 mm. Hg.

Preferably, the initial molar ratio of the hydrogen peroxide:water system is above 3:1.

Preferably, the process is carried out at a pressure of between 30–50 mm. Hg and the vapour phase in contact with the phase containing the bisulphate preferably contains at least from 50 to 60 moles percent hydrogen peroxide based on the hydrogen peroxide plus water concentration of the vapour, and desirably from 50 to 80 moles percent.

Preferably, the permonosulphate product obtained by the process of the present invention is isolated from associated hydrogen peroxide by a technique such as steam stripping or crystallisation.

Advantageously from the point of view of maximum yield temperatures in the range 125 to 145° C. should be employed. This is especially so in the continuous film embodiment according to the invention, which embodiment is referred to in detail hereinafter.

We have found that where the conditions of pressure and the molar ratios of hydrogen peroxide:water conform substantially to the preferred values indicated above, high yields of the permonosulphate product are obtained. Thus for instance, when employing potassium bisulphate, conversions of at least 30% are achieved; even 70 to 80% conversions being obtainable.

The reaction is reversible, and proceeds according to the following reaction equation:

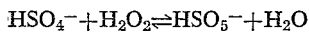

$$HSO_4^- + H_2O_2 \rightleftharpoons HSO_5^- + H_2O$$

wherein the cation is selected from those named above.

It is well-known that hydrogen peroxide and sulphuric acid react rapidly, even at room temperature, to give permonosulphuric acid. Thus it would be expected that the sulphuric acid could be employed as a catalyst for the reaction depicted above. We have found that in processes in accordance with the present invention the reaction is so catalysed. However, most unexpectedly we have found that the presence of acid adversely affects the maximum yield of permonosulphate obtainable. Consequently we prefer to conduct the reaction in the absence of auxiliary additives such as acids or compounds which would give rise to acids during the reaction. It has also been found that surprisingly, even in the absence of such auxiliary additives, the reaction according to the invention proceeds rapidly to equilibrium i.e. in times in the order of 30 minutes. Thus the process provides the advantages of good rate of reaction and good conversion.

It must be appreciated however that the equilibrium position is never moved entirely to the right and so the permonosulphate obtained by the present reaction will always have bisulphate and hydrogen peroxide associated with it. When concentrated hydrogen peroxide is employed at high temperature it is desirable to employ lower pressure in order to reduce the danger of explosion of hydrogen peroxide. In general, the lower the pressure in the system the smaller the amount of residual hydrogen peroxide. Lowering the pressure, however, can give rise to other effects. For instance, at a given temperature, lowering the pressure may increase the rate of evaporation to an extent sufficient to bring about the precipitation of bisulphate from solution and thus a reduction in the conversion. Thus, for a particular application an optimum pressure can be determined.

The product can be isolated from associated hydrogen peroxide by passing the product through a steam stripping column. Product and steam are passed in counter-current into the column, which can conveniently be disposed vertically so that the product can be fed in at the top and the steam at the bottom. The column is operated at low pressure and hence can be made part of a continuous low pressure system. The column can be suitably packed to encourage contact between the vapour and liquid phases. By employing excess steam the hydrogen peroxide is removed from the product and passes out of the top of the column as vapour. Hydrolysis of the permonosulphate does not occur to any detectable extent. This is surprising and represents a considerable advantage. The product is run off from the base of the column as an aqueous solution.

Alternatively, the product can be isolated from its associated hydrogen peroxide by crystallisation. By cooling a saturated solution from an elevated temperature, crystals of permonosulphate separate out and may be removed from the liquor by filtration or centrifuging.

The process of the present invention can be carried out in several types of apparatus.

A simple form of the process is a batch process in which the bisulphate and aqueous hydrogen peroxide are heated in a low pressure vessel for example at 100° C., and 40 mm. Hg. The expelled vapour is concentrated by fractionation, the fractionating column being also operated at 40 mm. Hg. The condensed hydrogen peroxide can be reused in a further batch process.

A simple type of apparatus for carrying out the process continuously comprises a heated vessel with a feed inlet, and an outlet for product and vapour. Conveniently the outlet is an overflow tube. In carrying out the process the pressure is maintained at a reduced level by pumps, a preferred pressure range being 30 to 50 mm. Hg. The expelled vapour can be passed through a fractionating column in which the vapourised hydrogen peroxide is condensed. The condensed hydrogen peroxide, after any necessary concentration, can then be recycled for use as feed. The feed is conveniently a solution of bisulphate in concentrated hydrogen peroxide. The solution is drawn into the vessel through a narrow tube by the low pressure in the vessel. The heat input is adjusted so that the desired degree of evaporation is achieved continuously. The product passes continuously out of the overflow tube, the rate of feed being adjusted to determine the residence time of a particular sample in the vessel. Thorough mixing is desirable in the vessel to ensure that the product does not contain a high proportion of newly added feed liquor. The product can be isolated from associated hydrogen peroxide by a method as described above.

One process in accordance with the invention comprises forming a solution of the bisulphate in the aqueous hydrogen peroxide and effecting the reaction by passing a film of this solution along the internal wall of a reaction vessel (maintained at the selected temperature and pressure) in the presence of the vapour concomitantly formed.

One type of apparatus suitable for this continuous process is a climbing film evaporator. The climbing film evaporator comprises a narrow suitably inclined (preferably vertical) cylindrical column enclosed in a steam jacket and maintained at reduced pressure. In carrying out the process, a pressure within the range 30 to 50 mm. Hg is preferred. The feed liquor is a solution of bisulphate in hydrogen peroxide, which feed liquor is drawn into the base of the column by the reduced pressure. Sufficient heat is applied to evaporate the major part of the solvent, which assists a flow of vapour upwards through the column, which flow causes a film of bisulphate and permonosulphate in aqueous hydrogen peroxide to climb the walls of the column. The internal cross-sectional area of the column is sufficiently small to enable this to happen. In effect, the lower part of the column acts as a vertical boiler, and the climbing film is formed in at least the upper part of the column. The greater part of the conversion of bisulphate to permonosulphate occurs in the film in the upper part of the column. The most effective use of the column is achieved by adjusting the feed rate and the temperature so that equilibrium conversion of bisulphate to permonosulphate is obtained near the top of the column. Because of the high relative volatility of water the product emerging from the top of the column contains a very small amount of water. The product can again be isolated from the hydrogen peroxide by a method as described above. The vapours from the column are collected independently from the product and may be concentrated by one or more fractionations and used to dissolve further bisulphate as feed.

Another type of apparatus which may be employed in a continuous application of the process of the present invention comprises a heated vessel with reduced internal pressure (e.g. 30 to 50 mm. Hg) with a feed inlet, a vapour outlet and a product outlet, which enable feed to be continuously run in, and product to be continuously withdrawn from the vessel. The vapour outlet is attached to a fractionating column into the top of which water is run. The water passing into the top of the column condenses the hydrogen peroxide vapour and is itself evaporated so that the vapour product passing out of the column is almost entirely water. The condensed hydrogen peroxide may be further concentrated if desired and then recycled to the reaction vessel. If the hydrogen peroxide is constantly returned to the reaction vessel, the molar ratio of hydrogen peroxide to bisulphate to achieve a given conversion can be less than in previous embodiments. By lowering the proportion of hydrogen peroxide in the feed, however, it may no longer be possible to dissolve all the bisulphate in the feed and so solid bisulphate may have to be added to the vessel. The extent of the conversion of bisulphate to permonosulphate is dependent upon the rate of evaporation of the solvent, the residence time in the vessel, and the efficiency of the fractionating column. The rates of feed, product withdrawal, and evaporation are adjusted to determine the residence time of a particular sample in the vessel, and to maintain a constant volume of liquid in the vessel.

A further type of apparatus suitable for the continuous application of the present invention comprises a counter-current vertical column which is loosely packed with solid bisulphate fed into the top of the column to serve as a reservoir of bisulphate to maintain a substantially saturated solution of bisulphate under the reaction conditions. Concentrated hydrogen peroxide vapour at a temperature of the order of 100° C., is fed in at the base. The pressure inside the column is maintained at a reduced level (e.g. 30 to 50 mm. Hg). The hydrogen peroxide passes up the column, is condensed on the bisulphate, reaction occurs, and a solution of permonosulphate and bisulphate in hydrogen peroxide passes out of the base of the column. External cooling can be provided to condense the hydrogen peroxide vapour. Alternatively sufficient water is introduced into the column at the top to bring about the condensation of substantially all the hydrogen peroxide vapour. The water added to the column can contain the same bisulphate in solution to react with some of the hydrogen peroxide. This will reduce the consumption of solid bisulphate so the rate of addition of solid bisulphate to the column can be decreased. The feed rates are adjusted so that the vapour passing out the top of the column contains little or no hydrogen peroxide. The reaction occurs throughout the column, the extent of the conversion of bisulphate to permonosulphate being dependent on the concentration of hydrogen peroxide in the vapour feed. The product is a solution of bisulphate and permonosulphate in aqueous hydrogen peroxide. The hydrogen peroxide may be isolated by a method described above.

The invention is further illustrated by the following examples:

*Example 1*

A solution of 724 gm. of potassium bisulphate ($KHSO_4$) in 1 litre of hydrogen peroxide ($H_2O_2$) of 85% by weight at room temperature (molar ratio $H_2O_2:KHSO_4=6.4:1$) was drawn at the rate of 4.3 ml./min. into a vessel of a total volume of 150 ml. in which the internal pressure was maintained at 40 mm. Hg by pumps. The vessel was immersed in a liquid bath at a temperature of 130° C. which gave an internal temperature of about 100° C. The residence time of a particular sample of feed was approximately 30 minutes. The concentration of hydrogen peroxide in the vapour was 72% by weight. 68.2% of the potassium bisulphate was converted to potassium permonosulphate. The active oxygen recovery was 95.5%.

The product was fed from the vessel into a counter-current steam stripping column which was packed with small glass rings. The molar ratio of steam:hydrogen peroxide removed was 42:1. Under the conditions prevailing in the column no hydrolysis of permonosulphate was detected. The aqueous hydrogen peroxide vapour expelled was added to the vapour from the evaporating column to be concentrated, condensed and used in fresh feed. The liquid residence time in the steam stripping column was about 30 minutes. 94% of the residual hydrogen peroxide was removed from the product in the steam stripping column.

*Example 2*

A solution of 736 gm. of potassium bisulphate in 1 litre of 86% by weight hydrogen peroxide at room temperature (molar ratio $H_2O_2:KHSO_4=6.4:1$) was drawn at the rate of 3.7 ml./min. into a climbing film evaporator. The climbing film evaporator had a column length 66.0" and diameter 0.4". The upper 60.0" of the column were enclosed in a steam jacket through which steam at 100° C. was passed. The pressure inside the column was maintained at 40 mm. Hg, by pumps. The film which formed on the walls of the column, climbed at about 5"/min., and thus spent about 12 minutes in the column. The liquid phase passing out of the column contained, by weight, 63% $KHSO_5$, 18% $KHSO_4$ and 18% $H_2O_2$, and the vapour phase contained 74% $H_2O_2$ and 26% $H_2O$ by weight.

The liquid product from the climbing film evaporator was fed into the top of the counter-current steam stripping column as described in Example 1. The product passed out of the base of the stream stripping column and was of the following composition:

| | Gm./l. |
|---|---|
| Potassium permonosulphate | 850 |
| Potassium bisulphate | 240 |
| Hydrogen peroxide | 17.0 |

The conversion of bisulphate to permonosulphate was therefore about 76%. Active oxygen recovery was 99%.

*Examples 3–5*

Example 2 was repeated adding sulphuric acid in amounts corresponding to 0.2, 1.0 and 1.6 equivalents of added sulphuric acid per kilogram of reactants. It was found that the conversion of potassium bisulphate to potassium permonosulphate dropped appreciably, being 73%, 65% and 61% respectively.

*Example 6*

A solution of 624 gm. of ammonium bisulphate in 1 litre of hydrogen peroxide of 86% by weight (molar ratio $H_2O_2:NH_4HSO_4=6.4:1$) was employed in the climbing film evaporator described in Example 2 under the same conditions of temperature and pressure as in Example 2. The vapour phase contained 72% by weight of hydrogen peroxide. The conversion of ammonium bisulphate to ammonium permonosulphate was 57.5%.

*Example 7*

A solution of 650 gm. of sodium bisulphate in 1 litre of hydrogen peroxide of 86% by weight (molar ratio $H_2O_2:NaHSO_4=6.6:1$) was employed in the climbing film evaporator described in Example 2 under the same conditions of temperature and pressure as in Example 2. The vapour phase contained 73% by weight of hydrogen peroxide. The conversion of sodium bisulphate to sodium permonosulphate was 26.5%.

*Example 8*

Example 2 was repeated with the difference that the temperature employed was 135° C. The vapour phase contained 77.2% by weight of hydrogen peroxide. The conversion of potassium bisulphate to potassium permonosulphate was 78%. The liquid product from the climbing film evaporator contained less hydrogen peroxide than that obtained in Example 2 and had the following composition by weight: 68.7% $KHSO_5$, 22.6% $KHSO_4$, and 8.4% $H_2O_2$. The active oxygen recovery was again 99%.

What I claim is:

1. A process for the production of a permonosulphate selected from the group consisting of permonosulphates of sodium, potassium, rubidium, caesium and ammonium by reaction between the corresponding bisulphate and hydrogen peroxide, which process comprises forming an aqueous solution containing hydrogen peroxide and the corresponding bisulphate in a molar ratio of at least 3:1, feeding said solution through a reaction column in the form of a film moving along the internal wall thereof; maintaining in the column a temperatue of from 70° C. to 150° C., and a pressure of from 30 to 100 mm. Hg so that the vapour phase in contact with the film contains between 30 to 100 moles percent of hydrogen peroxide based on the hydrogen peroxide and water content of the vapour; and removing resulting permonosulphate-containing reaction product from the column.

2. A process according to claim 1 wherein the vapour phase in contact with the film contains between 30 and 80 moles percent of hydrogen peroxide.

3. A process according to claim 1, wherein the said pressure is from 30 to 50 mm. Hg.

4. A process according to claim 1, wherein the said ratio of hydrogen peroxide to bisulphate is about 6:1.

5. A process according to claim 1, wherein the said temperature is from 100° C. to 135° C.

6. A process according to claim 1, wherein the said rate of feed and temperature are so selected that the film nears the point of removal of product from the column as reaction between hydrogen peroxide and bisulphate is completed.

7. A process for the production of a permonosulphate selected from the group consisting of permonosulphates of sodium, potassium, rubidium, caesium and ammonium by reaction between the corresponding bisulphate and hydrogen peroxide, which process comprises forming an aqueous solution containing hydrogen peroxide and the corresponding bisulphate in a molar ratio of at least 3:1, said solution being free from acids and compounds which would form acids; feeding said solution through a reaction column in the form of a film moving along the internal wall thereof; maintaining in the column a temperature of from 70° C. to 150° C. and a pressure of from 30 to 100 mm. Hg so that the vapour phase in contact with the film contains between 30 and 100 moles percent of hydrogen peroxide based on the hydrogen peroxide and water content of the vapour; and removing resulting permonosulphate-containing reaction product from the column.

8. A process according to claim 7, wherein the vapour phase in contact with the film contains between 30 and 80 moles percent of hydrogen peroxide.

9. A process according to claim 7, wherein the said pressure is from 30 to 50 mm. Hg.

10. A process according to claim 7, wherein the said ratio of hydrogen peroxide to bisulphate is about 6:1.

11. A process according to claim 7, wherein the said temperature is from 100° C. to 135° C.

12. A process according to claim 7, wherein the said rate of feed and temperature are so selected that the film nears the point of removal of product from the column as reaction between hydrogen peroxide and bisulphate is completed.

13. A process according to claim 7, wherein the solution formed initially contains hydrogen peroxide in a concentration of at least 85% by weight.

14. A process for the production of a permonosulphate selected from the group consisting of permonosulphates of sodium, potassium, rubidium, caesium and ammonium by reaction between the corresponding bisulphate and hydrogen peroxide, which process comprises forming an aqueous solution containing hydrogen peroxide and the corresponding bisulphate in a molar ratio of at least 3:1, said solution being free from acids and compounds which would form acids; feeding said solution through a substantially vertical reaction column in the form of a film moving along the internal wall thereof; maintaining in the column a temperature of from 100° C. to 135° C. and a pressure of from 30 to 50 mm. Hg so that the vapour phase in contact with the film contains between 30 and 80 moles percent of hydrogen peroxide based on the hydrogen peroxide and water content of the vapour; and removing resulting permonosulphate-containing reaction product from the column.

15. A process according to claim 14, wherein the said rate of feed and temperature are so selected that as the film nears the point of removal of product from the column reaction between hydrogen peroxide and bisulphate is completed and wherein the vapour product issuing from the column is fractionated and hydrogen peroxide so obtained is re-cycled.

References Cited by the Examiner

UNITED STATES PATENTS 3,002,813   10/61   Darbee et al. _____ 23—114

MAURICE A. BRINDISI, *Primary Examiner.*